United States Patent [19]

Gahwiler

[11] Patent Number: 4,844,512

[45] Date of Patent: Jul. 4, 1989

[54] FREELY ROTATABLE SNAP-FIT CONNECTOR FOR PIPES

[75] Inventor: Heinz U. Gahwiler, Domat/Ems, Switzerland

[73] Assignee: Ems-Inventa AG, Switzerland

[21] Appl. No.: 200,004

[22] Filed: May 27, 1988

[30] Foreign Application Priority Data

Jul. 6, 1987 [CH] Switzerland ............... 2603/87

[51] Int. Cl.$^4$ .................................. F16L 35/00
[52] U.S. Cl. ................... 285/39; 285/275; 285/351; 285/423; 285/921
[58] Field of Search ........... 285/423, 275, 921, 39, 285/351

[56] References Cited

U.S. PATENT DOCUMENTS

| | | |
|---|---|---|
| 3,990,727 | 11/1976 | Gallagher .............. 285/423 X |
| 4,214,586 | 7/1980 | Mericle ................ 285/921 X |
| 4,673,200 | 6/1987 | Miyauchi .............. 285/921 X |

FOREIGN PATENT DOCUMENTS 3143015 6/1982 Fed. Rep. of Germany .

*Primary Examiner*—Dave W. Arola
*Attorney, Agent, or Firm*—Jordan B. Bierman

[57] ABSTRACT

A connector having a male part and a female part, the latter having a hollow body and a hollow housing portion connected thereto to form a passage for flow of fluid. The portion is provided with at least one detent on the inside wall and has an opening on the end remote from the body. The detent is provided with a sloping surface which flares in the direction of the opening and also has an abutment surface facing toward the body.

The male part has a front end which is inserted into the opening and carries an inclined surface which is complementary to the sloping surface of the female part. In a manner analogous to the female part, the male part is provided with an abutment facing away from the front end and adapted to abut the abutment surface on the female part when the connector is in closed position.

12 Claims, 6 Drawing Sheets

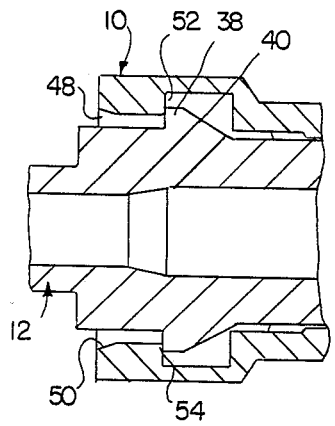
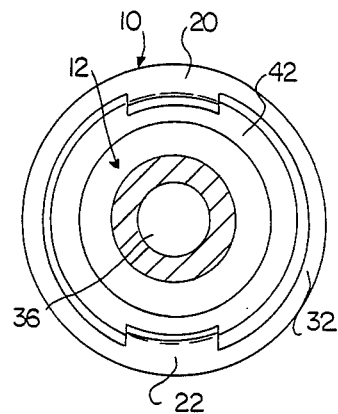
FIG. 3     FIG. 4
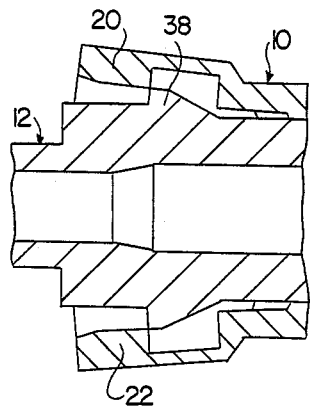
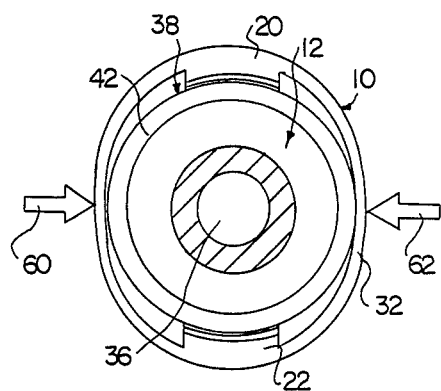
FIG. 5     FIG. 6

FREELY ROTATABLE SNAP-FIT CONNECTOR FOR PIPES

This Application claims the priority of Swiss application 2603/87, filed July 6, 1987.

The present invention is directed to an improved snap-fit connector, particularly one intended for use with hoses, pipes, or similar devices, wherein quick connect and disconnect is required and leakage is to be avoided.

BACKGROUND OF THE INVENTION

Snap-fit connectors are useful in a wide range of applications. They are often utilized for joining liquid-carrying hoses, pipes, air hoses, as well as in industrial applications in general. In particular, automobile assemblies by robots require the use of such connectors. They should be capable of being closed in a uniaxial movement and should be simple and inexpensive to produce.

Moreover, many of the liquids which pass through such connectors are highly inflamable, or otherwise dangerous, and government regulations require high degrees of operational safety of the components. Existing connectors, e.g. for fuel pipelines in automobiles, consist primarily of metal portions which are screwed together. Normally, circumferential reverse cuts are necessary which require careful and expensing machining.

Obviously, quick connect and disconnect closures for gasoline pipelines would be extremely desirable, but have not heretofore been successfully produced.

One known device comprises a female component including three spring-loaded cams which can be blocked by a prestressed ring rotatable on its outside. The cams project through the wall of the female component, and a ring having an abutment surface for the cams is disposed on the outside of the corresponding male element. This connector, as can easily be seen, consists of numerous parts, is of complicated construction and, hence, is expensive to manufacture. Moreover, because of its complexity, it is unreliable in use.

Another form of connector is set forth in German Application DE No. 31 43 015. This device comprises a male element having a ring with an abutment surface. This element is adapted to be inserted into the complementary female component. The latter comprises apertures through which a clip can be inserted and the clip, when in place, bears against the abutment surface. In addition to the foregoing, a closing or locking component is also necessary. This component can be lost when the device is released by withdrawing it from the connector. Moreover, since the clip has to be inserted into the openings, it is not possible to assemble this by robotic means.

BRIEF DESCRIPTION OF THE INVENTION

It is an object of the present invention to provide a connector which is suitable for long term operation, inexpensive to manufacture, and capable of being assembled by robots.

The connector in accordance with the present invention comprises a male part and a female part. The latter has a holow body and a hollow housing portion connected thereto, thereby forming a passage for the flow of fluid. The housing portion has at least one detent on the inside wall thereof and has an opening remote from the body which is adapted to receive the male part. It is, of course, preferable that there be at least two such detents. Each detent is provided with a sloping surface flaring in the direction of the opening and having an abutment surface facing toward the body.

The male part is provided with a front end which is adapted for insertion into the opening in the female part. The front end is, of course, smaller in diameter than the opening. The male part also carries an inclined surface on its exterior surface complementary to the sloping surface on the detent. There is an abutment on the male part facing away from the front end and adapted to abut the abutment surface on the interior of the female part when the connector is in its connected or closed position.

In a preferred form of the device, there are two detents spaced about 180° apart. It is also to be preferred that the housing portion of the female part of the connector be flexible so that inward pressure will cause its cross-section to distort into an elongated shape. This permits ready release of the connector when desired.

In a further preferred form of the connector, there are two lateral apertures spaced about 180° apart on said housing. This enables access to the abutment and abutment surface interface so that the device can be released by means of a fork-shaped tool which is inserted through one of the apertures and bears against the inner surface of the housing so as to cause the detent to spread and clear the abutment. This permits the parts of the connector to be moved axially away from one another and disconnected.

For protection against leaking, one or more annular grooves can be provided in the male part with sealing rings located therein. These rings will bear against the inside surface of the body of the female part to form the seal.

In a further embodiment of the invention, the apertures in the housing portion are defined by a circumferential ring surrounding the opening and perpendicular to the longitudinal axis thereof and two webs, spaced apart about 180° from each other, parallel to the axis. There are two detents, spaced apart about 180° from each other, and the webs are about 90° from the detents. Alternatively, the detents may be located on the internal surface of the housing portion adjacent the points at which the webs meet the ring.

In a further modification of the present invention, the annular ring of the housing portion is roughly of an oval or elliptical shape in cross-section perpendicular to its axis. This produces an elongated diameter (in the longer direction) and a minor diameter in the shorter direction. Preferably, these diameters are approximately 90° to one another. The detents are on the minor diameter.

In a still further embodiment of the present invention, the abutment surface is undercut and the abutment is complementary thereto. This provides an additional locking means for the connector.

In all of the foregoing embodiments, connection is accomplished merely by inserting the male part into the female part in the longitudinal axial direction until the abutment and abutment surface snap into place. Obviously, such assembly is quite simple and can be performed by robots as well as by human beings.

To disconnect, there are various options available. In most of the foregoing devices, it is necessary only to squeeze the end of the housing portion remote from the body at two points approximately diametrically opposite one another and remote from the detents. This causes the opening to elongate so that the abutment surfaces on the detents will be clear of the abutments on the male part and the connector can be released. Alternatively, if the abutment on the male member comprises only a portion or portions of the circumference, it can be rotated until a portion having no abutment coincides with the abutment surface on the female part. Here, too, the members may then be separated.

Alternatively, a forked shaped tool may be inserted through the apertures in the housing portion to bear against the inner wall adjacent the detents and cause it to spread, allowing release.

In the last embodiment of the invention, an additional locking means is provided. Since the abutment surface is undercut, it is necessary to first move the two components axially toward each other until the abutment is no longer contained within the undercut of the abutment surface. Thereafter, the sides of the ring are squeezed in the usual manner to cause elongation, whereby the connector is released.

BRIEF DESCRIPTION OF THE DRAWINGS

In the accompanying drawings, constituting a part hereof,

FIG. 3 is a fragmentary longitudinal crosssectional view of the embodiment as shown in FIG. 2;

FIG. 4 is a fragmentary transverse crosssection view of the embodiment shown in FIG. 2;

FIGS. 5 and 6 correspond to FIGS. 3 and 4, except that they show the device being released;

DETAILED DESCRIPTION OF THE INVENTION

Figure 1:
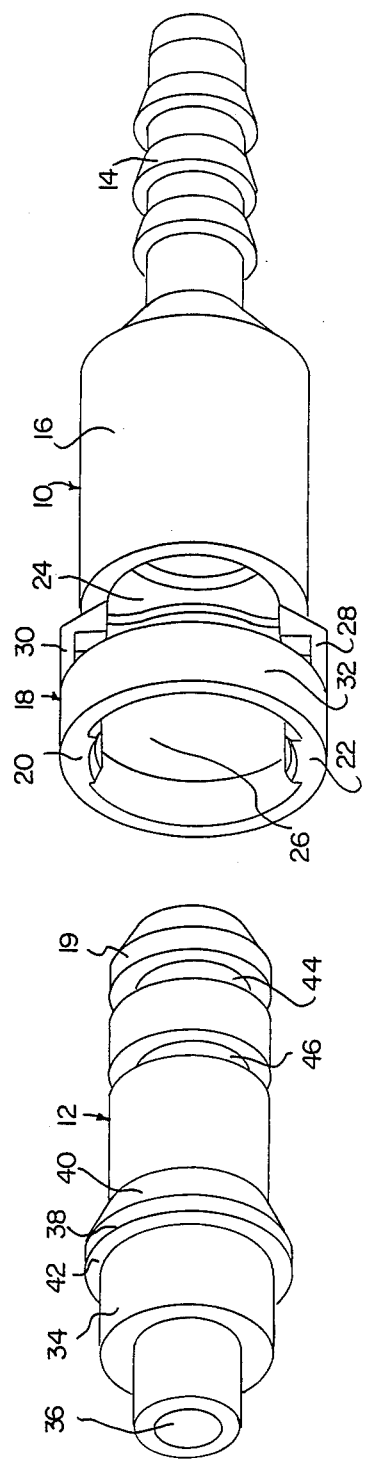
FIG. 1 is a prospective exploded view of one embodiment of the present invention.
Figure 2:
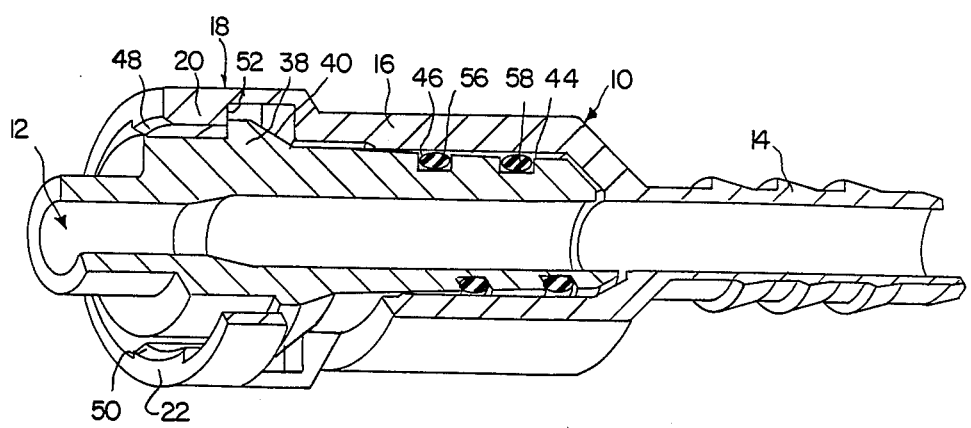
FIG. 2 is a longitudinal view, partly in section, of the embodiment of FIG. 1, shown in the connected position.

Referring more specifically to FIG. 1, the connector of the present invention comprises female part 10 and male part 12. Female part 10 has body 16 with connection 14 to a hose or similar fluid carrier at one end thereof. At the opposite end of body 16 is housing portion 18 having an opening at the face thereof and apertures 24 and 26 on the circumferential side thereof. Apertures 24 and 26 are defined by webs 28 and 30, annular ring 32, and the remainder of housing portion 18. The inner surface of housing portion 18 is larger in diameter than front end 19 of male part 12.

Female part 10 is also provided with detents 20 and 22 located approximately 180° apart on the inner surface of ring 32. Detents 20 and 22 are provided with sloping surfaces 48 and 50 and, at the rear thereof, abutment surfaces 52 and 54.

Male part 12 carries inclined surface 40 forming flange 38 and abutment 42. Pipe end 34 is intended for connection to an outside hose or similar device. Annular grooves 44 and 46 are also provided in male part 12 and O-rings 56 and 58 are located therein for sealing purposes.

To couple the connector, male part 12 is inserted into housing portion 18 of female part 10. Inclined surface 40 bears against sloping surfaces 48 and 50 to cause ring 32 to spread as male part 12 continues to be moved into female part 10. Detents 20 and 22 ride over the edge of flange 38 and abutment surfaces 52 and 54 snap into place and lock against abutment 42. O-rings 56 and 58 seal against the inner surface of body 16, thereby preventing leakage of fluid. Of course, bore 36 extends through both parts of the connector for passage of fluid. The release of the coupling is particularly shown in FIGS. 3 to 6. Inward pressure is exerted in the direction of arrows 60 and 62 (see FIG. 6), thereby causing ring 32 to elongate. This permits detents 20 and 22 and abutment surfaces 52 and 54 to be moved beyond abutment 42 and flange 38. The male part and female part can then be separated by moving them axially away from each other.

Alternatively, a fork-shaped tool (not shown) may be inserted through apertures 24 and/or 26 so that contact is made with webs 28 and 30. This will cause webs 28 and 30 to spread, thereby deforming ring 32. Thus, ring 32 assumes substantially the same configuration as is shown in FIG. 6. Detents 20 and 22 (along with abutment surfaces 52 and 54) will now be clear of abutment surface 42 and flange 38, thereby permitting release of the two parts of the connector.

Figure 7:
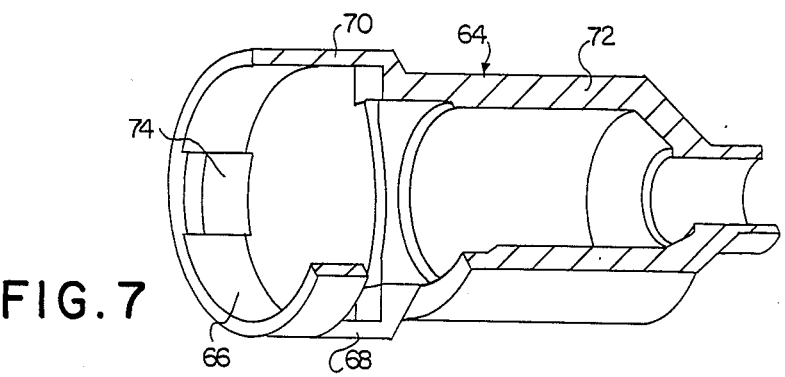
FIGS. 7 to 9 are views, partly in section, of further embodiments of the female part in accordance with the present invention.

Referring to FIG. 7, an integral housing portion 64 is provided. Webs 68 and 70 extend from cylindrical zone 72 to ring 66, thereby defining the apertures therein. Detent 74, and a second detent diametrically across ring 66 therefrom (not shown) are mounted on ring 66 at a point approximately 90° from webs 68 and 70. As a result of this location, tension on the connector produces a counter force against the force exerted by the detents, thus counteracting the tendency of the connector to open under a high tension load. Moreover, such tension would cause constriction of ring 66 of housing portion 64 thereby increasing the locking effect of the connector.

Figure 8:
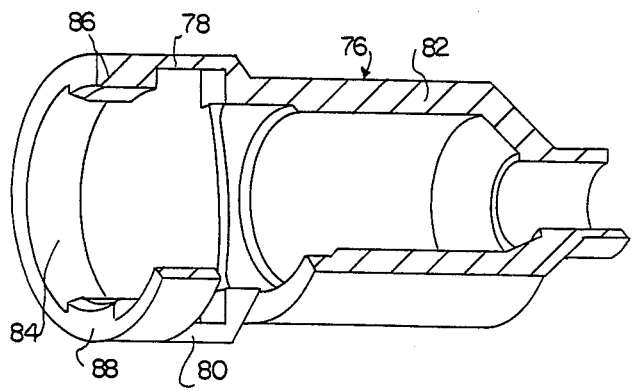

In FIG. 8, a further modification of the device is shown. This is quite similar to that of FIG. 7, having housing portion 76 and webs 78 and 80, along with ring 84 and the remainder of the housing defining the apertures therein. In this embodiment, however, detents 86 and 88 are located on ring 84 at the points at which webs 78 and 80 are connected thereto.

Figure 9:
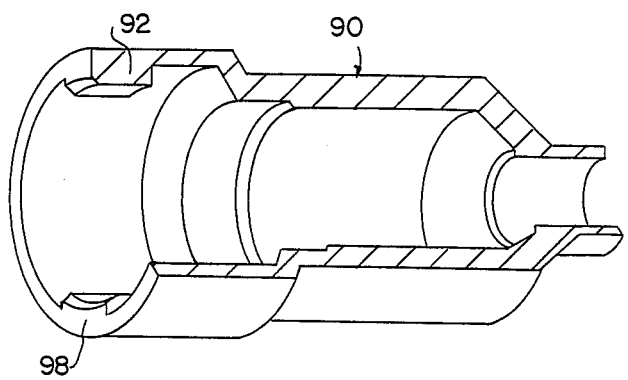
Figure 10:
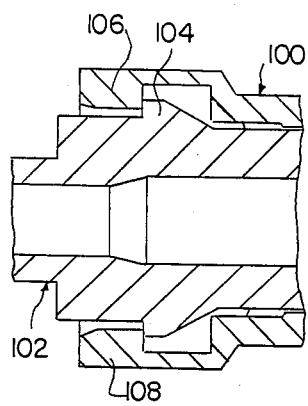
FIGS. 10 to 13 are similar to FIGS. 3 to 6, showing a further embodiment of the invention wherein the housing portion has an oval annular ring.

Referring now to FIG. 9, housing portion 90 is integral, having no apertures at all. Detents 92 and 98 are formed on the inner wall thereof and otherwise act in the same manner as the other embodiments.

Figure 11:
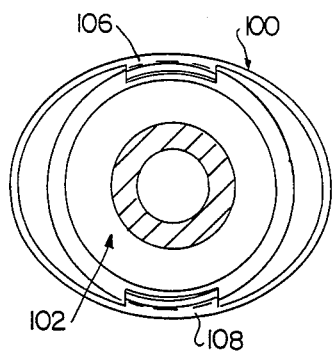
Figure 12:
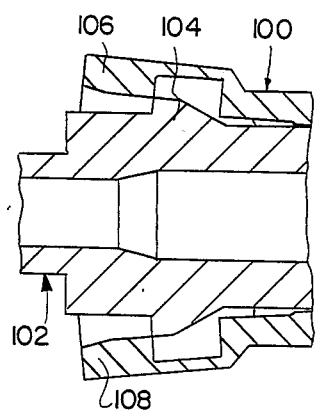
Figure 13:
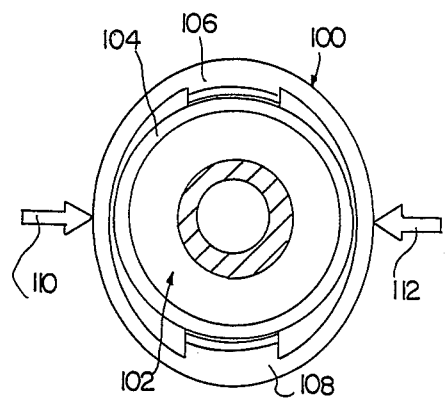

In the modification shown in FIGS. 10 to 13, the connector comprises female part 100 and male part 102. The latter includes flange 104 which is analogous to the embodiment shown in FIGS. 1 to 6. Female part 100, as shown in FIGS. 11 and 13, is initially of oval or elliptical cross-section. Detents 106 and 108 are located along the minor axis thereof. To release this embodiment, inward pressure is exerted in the direction and location of arrows 110 and 112, along the major axis of female part 100. This causes distortion thereof so that it assumes the cross-section as shown in FIG. 13. As a result, detents 106 and 108 are clear of flange 104 and the associated abutment. The connector can thereby be released.

Figure 14:
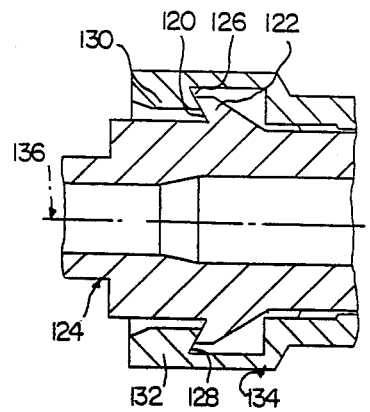
FIG. 14 is a fragmentary view in longitudinal section of a still further embodiment of the present invention in the connected position.
Figure 15:
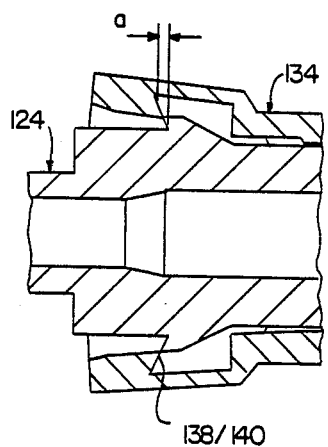
FIG. 15 is a view similar to that of FIG. 14 showing the connector during release.

A still further embodiment of the present invention is shown in FIGS. 14 and 15. This is substantially analogous to the embodiments shown in FIGS. 1 to 13 except for abutment 120 of flange 122 on male part 124 and abutment surfaces 126 and 128 of detents 130 and 132 on female part 134. In essence, undercut tips 138 and 140 are provided on abutment surfaces 126 and 128. Abutment 120 is correspondingly shaped. As a result, as can be seen in FIG. 14, abutment 120 and abutment surfaces 126 and 128 lock tightly together when snapped into place. They cannot be separated (without breaking the connector) unless the parts are moved axially toward one another a distance a before inward force is applied to cause female part 134 to assume its elongated position. Thereafter, the connector may be released.

Alternately, if abutment 120 is provided with discontinuances therein, male part 124 can be rotated until such discontinuances are in register with abutment surfaces 126 and 128. The parts can then be separated by axial movement away from each other.

While only a limited number of specific embodiments of the present invention have been expressly disclosed, it is, nonetheless, to be broadly construed and not to be limited except by the character of the claims appended hereto.

I claim:

1. A connector comprising a male and female part, said female part having a longitudinal axis and a hollow body and a hollow housing portion connected thereto to form a passage for the flow of fluid therethrough, said housing portion being provided with two detents on the inside wall thereof, and having an opening removed from said body, said detents having a sloping surface flaring toward said opening and having an abutment surface facing toward said body, said female portion further comprising a circumferential ring separated from said hollow housing portion by two webs spaced apart about 180° from each other, said two detents being spaced apart about 180° from each other at positions wherein said webs join said circumferential ring and extending substantially from said opening to said web, said male part having a front end adapted for insertion into said opening, an inclined surface complementary to said sloping surface on said female part, an abutment on said male part facing from said front end and adapted to abut said abutment surface when said connector is in a connected position, whereby said male part and said female part are releasably locked together.

2. The connector of claim 1 wherein said hollow housing portion has two lateral apertures spaced about 180° apart, said apertures being defined by said circumferential ring, said housing and said two webs spaced apart about 180° from each other, said webs exending parallel to said axis.

3. The connector of claim 2 wherein said apertures are adapted to accept the insertion of a release fork, said release fork being shaped so that when said connector is in the connected position, insertion into the apertures of said housing causes an outward pressure to be imparted on said webs thereby deforming said circumferential ring in the axis of said webs, and releasing said latches, thereby permitting the separation of said male and female part.

4. The connector of claim 1 wherein said housing portion is flexible and inward pressure at points remote from said detents will cause said housing to assume an elongated cross-sectional shape.

5. The connector of claim 1 comprising at least one seal between an outside wall of said male part and said inside wall of said body.

6. The connector of claim 5 wherein said seal comprises at least one annular groove in said male part and a sealing ring is in said annular groove.

7. The connector of claim 6 wherein there are two said annular grooves and a sealing ring in each said annular groove.

8. The connector of claim 1 wherein said housing portion has an elongated diameter and a minor diameter, both perpendicular to a longitudinal axis of said female part, said elongated diameter and said minor diameter being about 90° to each other, said detents being on said minor diameter.

9. The connector of claim 1 wherein said abutment surface is undercut and said abutment is complementary thereto.

10. The connector of claim 1 wherein said connector is of polyamide or polyamide blends.

11. The connector of claim 1 wherein a first mount is located on said male part remote from said front end and a second mount is located on said female part remote from said opening.

12. The connector of claim 1 wherein said abutment extends only partly around said male part.

* * * * *